3,573,099
PROCESS FOR MAKING GARNET FILMS

Eugene B. Moore and Daniel A. Nepela, Saratoga, Calif., assignors to International Business Machines Corporation, Armonk, N.Y.
No Drawing. Filed Dec. 22, 1969, Ser. No. 887,352
Int. Cl. C04b 35/16, 35/50
U.S. Cl. 117—234      6 Claims

ABSTRACT OF THE DISCLOSURE

Crack free garnet films are deposited on a glass substrate. The glass substrate must have a low lead content and a thermal expansion coefficient within the range $85 \times 10^{-7}$ to $105 \times 10^{-7}$ and an annealing temperature of above 750° C. $Gd_3Fe_5O_{12}$ is deposited in a plurality of layers, the first one of which is less than 0.25 micron thick. The first layer is heated to complete crystallization prior to depositing any additional layer. There is a final heating to complete crystallization after the last deposition.

FIELD OF THE INVENTION

This invention is concerned with making crack free garnet films suitable for magneto-optic uses. This object is accomplished by the selection of a glass substrate having particularly specified properties and by a deposition technique involving the deposition of at least two layers of $Gd_3Fe_5O_{12}$ wherein the first layer is less than 0.25 micron thick and is heated to complete crystallization prior to any additional depositing of layers.

PRIOR ART

Numerous methods of preparation of garnet films on substrates have been attempted in the past. Prior to the present work however, generally unacceptable optical and magnetic performance has been obtained on glass substrates. Glass, however, is by far the most practical and economical substrate. Prior to the present invention, it has not been practical to obtain on a glass substrate crack free thin films with good magneto-optic properties suitable for use, for example, in memory systems.

SUMMARY OF THE INVENTION

These and other objects are obtained by the present invention. In the process of the present invention, a particular type of glass substrate is used. The glass substrate must simultaneously possess several properties. It must be substantially lead free. It must have a thermal expansion coefficient within the range $85 \times 10^{-7}$ to $105 \times 10^{-7}$. In addition, it must have an annealing temperature above 750° C.

$Gd_3Fe_5O_{12}$ is deposited on such a glass substrate. No particular method of deposition is required. Suitable methods include sputtering and spinning from solution, both techniques well known to the prior art. For simplicity sake and economy, spinning from nitrate solution is generally preferred.

It is an essential feature of the present invention that the first layer of $Gd_3Fe_5O_{12}$ be less than 0.25 micron thick. For optimum results a layer of from 0.05 to 0.1 micron thick is preferred. It is also an essential feature of the present invention that this first layer be heated to complete crystallization as garnet prior to depositing any additional layer.

Following the crystallization of the first garnet layer, one or more additional layers of $Gd_3Fe_5O_{12}$ are deposited. After each deposition, the deposited film should be dried at a temperature of about 300° C. During this drying step, the deposited nitrates are converted to an amorphous oxide layer before the following deposition. It is, however, not necessary that there be firing to crystallization between each deposition of a layer. (Crystallization occurs only at a higher temperature, preferably about 700° C.) It is sufficient that there be a firing to complete crystallization after the first layer is deposited and after the last layer.

Optimum results are obtained when the glass substrate is a barium titanium silicate glass having the other properties mentioned above. IR2 glass from Bausch and Lomb is a commercially available barium titanium silicate glass that has been modified by the addition of lanthanum, zirconium, tantalum, and zinc. Particularly outstanding results have been obtained with this glass.

Doubt exists as to exactly what is the theoretical explanation for the observed results. It is believed that the requirement for the thermal expansion coefficient of the glass is explained by the necessity for the glass to have a thermal coefficient of expansion approximating that of the garnet film to be deposited. It is also believed that the step of firing the first deposited layer to complete crystallization is essential in order that it may serve as a nucleus for epitaxial crystallization wherein the amorphous film grows in a direction perpendicular to the interface. While the above theoretical explanations are believed to be correct, they are offered solely for the purposes of explanations and are not intended to be limiting to the scope of the present invention.

The crack free garnet films obtained by the process of the present invention are suitable for magneto-optic uses, for example as memory elements in beam addressable systems. Their usefulness for such purposes is improved when some of the gadolinium ion in the $Gd_3Fe_5O_{12}$ is replaced by terbium. When more than about 4% of the gadolinium ions are replaced by terbium ions, there is achieved a squaring of the hysteresis loop and a lowering of the coercivity. The substitution of some of the gadolinium by terbium is a desirable but not essential optional feature of the present invention. For optimum results, the deposited film should preferably be the formula within the range of about $Tb_{0.125}Gd_{2.875}Fe_5O_{12}$ to about $Tb_{0.70}Gd_{2.30}Fe_5O_{12}$, i.e. from about 4% to about 25% of the gadolinium ions are replaced by terbium ions.

PREFERRED EMBODIMENTS

The general nature of the invention having been set forth, the following examples are now presented as to the specific preparation of preferred embodiments of the invention. The specific details presented are for purposes of illustration and not limitation.

Example I

The following example outlines the preferred procedure for making gadolinium iron garnet films.

Prepare a concentrated stock solution of gadolinium and iron nitrates.

80.8 g. $Fe(NO_3)_3 \cdot 9H_2O$
21.8 g. $Gd_2O_3$
25.0 ml. $HNO_3$ (70%)
10.0 ml. $H_2O$ Dry the oxide by firing in air at 800° C. for several hours prior to weighing. Add the acid to the water. Slowly add the oxide to this solution with continuous stirring. (Use care as this is a highly exothermic reaction.) Then add the ferric nitrate. Store in tightly stoppered acid resistant container. Should crystals form during storage, gently warm the container to redissolve prior to use.

Prepare the spinning solution by diluting 1 part (by volume) stock solution in 4 parts ethyl or denatured alcohol. This solution is unstable and will hydrolize after several days. The hydrolysis may be delayed by a month or more by adding citric acid at the rate of 0.5 g. per 50 ml. of spinning solution.

Clean the glass substrate by any technique which removes particles and films which could otherwise interfere with the uniform wetting by the spinning solution. (A sample test of cleanliness is to spin a coating of the solution and observe the uniformity of wetting.) Stubborn contamination can sometimes be removed by heating the bare substrate to 500° C. in air.

Support the clean substrate on the vacuum chuck of a photoresist spinner. Apply sufficient spinning solution to the center of the substrate to cover the entire substrate during spinning. (The amount needed is about 3 drops per square inch of surface.) Run the spinner at 1000–5000 r.p.m. (depending on the size of the substrate—the smaller, the faster) for 15–30 seconds. Immediately transfer the coated substrate to a hot plate surface at or near room temperature. Run the hot plate up to 300–500° C. and turn off.

When the sample is cool, transfer it to a ceramic lined furnace, heat to 700° C. and hold for 8 hours. Heating and cooling rates are not critical and are limited only by the thermal shock resistance of work and furnace parts and/or by the performance characteristics of the furnace. An alternate procedure is to heat to 760° C., hold for 2 hours. Either of these treatments completely crystallizes the film, a prerequisite for uniformity in the final film.

When the sample is cool, repeat the spin coating and hot plate drying sequence 10 times to build up a coating thickness of 1 micron. Fire this coating in the same furnace at 670° C. for 8 hours in air. Except for trimming the work to some desired shape and size, this completes the fabrication.

Example II

The following example outlines the preferred method for recording tests of gadolinium iron garnet films.

Sample films were functionally tested in a specially constructed setup for performing magneto-optic recording and readout. The sample was affixed to the edge of a disk and rotated through a focussed laser light beam. The light beam passed through apertures in the pole pieces of an electromagnet such that the sample would simultaneously experience the effects of illumination and a magnetic field. This assembly was enclosed in a chamber through which temperature controlled air was forced to provide positive control of sample temperature.

To record spots on the film, the sample was first magnetically saturated in one direction perpendicular to the plane of the film by using a large direct current in the electromagnet. Next, a smaller magnetic field was imposed on the sample in the direction opposite to the saturating field. While the sample was rotating through this environment, short, high intensity pulses of light were permitted to fall on the film. Because the film is highly absorbing to the wavelength of light used, the illuminated spots experience a brief temperature rise, and because the magnetic field required to saturate the film decreases with increasing film temperature, the spots underwent a reversal in direction of magnetization.

To read or sense the recorded spots, the sample was illuminated continuously with a low intensity polarized light beam. When the transmitted light was viewed through another polarizer set at near the extinction point, the occurrence of the spots passing through the beam constituted changes in light intensity (by means of the Faraday magneto-optic effect). These intensity changes were sensed by a photosensitive device and displayed on an oscilloscope for examination and measurement.

The light source used was an argon continuous gas laser operated at a wavelength of 4880 A. An electro-optic device was used to modulate the beam intensity and to keep the intensity low except for the recording operation. The beam was focussed by means of suitable lenses to form a spot on the film surface of about 5 microns diameter. The sample was moved through the 5 micron diameter beam at a rate of 7.3 meters per second.

Beam power for recording: 30 to 70 milliwatts
Beam power for sensing: About 10 milliwatts
Magnetic field for recording: 200–250 oersteds
Magnetic field for sensing: None

What is claimed is:

1. A process for preparing a crack free garnet film comprising:
   (1) depositing on a glass substrate which has (a) a low lead content, (b) a thermal expansion coefficient within the range $85 \times 10^{-7}$ to $105 \times 10^{-7}$, and (c) an annealing temperature above 750° C., a plurality of layers of $Gd_3Fe_5O_{12}$, with the first layer being less than 0.25 micron thick;
   (2) heating the first layer to complete crystallization to garnet prior to additional deposition;
   (3) depositing at least one additional layer of
   $$Gd_3Fe_5O_{12}$$
   and
   (4) heating again to complete crystallization after the last deposition.

2. The process as claimed in claim 1 wherein the first deposited layer is 0.05 to 0.1 micron thick.

3. A process as claimed in claim 1 wherein the glass substrate is a barium titanium silicate glass.

4. A process as claimed in claim 1 wherein the deposition steps are carried out by spinning.

5. A process as claimed in claim 1 where the crystallizing steps are carried out at a temperature of approximately 700° C.

6. A process as claimed in claim 1 wherein from about 4% to about 25% of the gadolinium ions in the $Gd_3Fe_5O_{12}$ are replaced by terbium ions.

References Cited

UNITED STATES PATENTS 3,059,538  10/1962  Sherwood et al. _____ 350—151
3,429,740  2/1969   Mee _____ 117—234X ALFRED L. LEAVITT, Primary Examiner E. G. WHITBY, Assistant Examiner U.S. Cl. X.R.

117—10, 123, 169, 235; 204—192; 340—174; 350—151; 65—33, 60